United States Patent Office 3,488,566
Patented Jan. 6, 1970

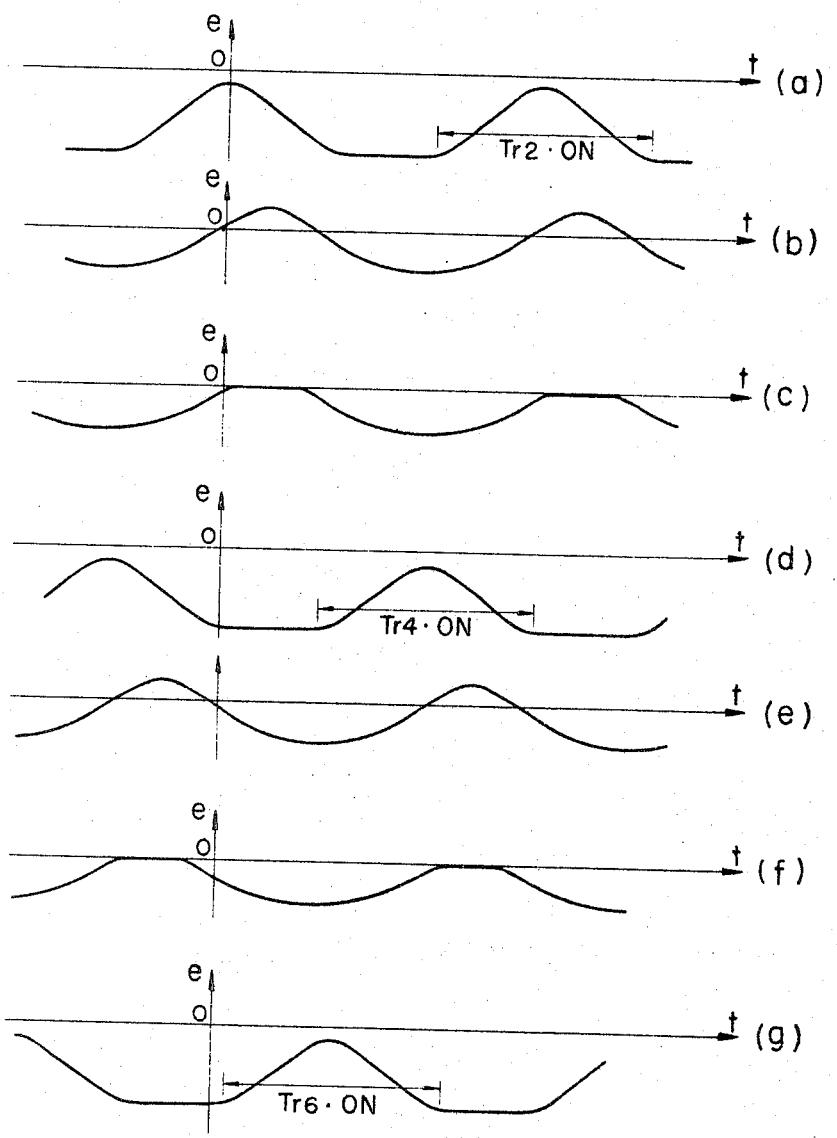

3,488,566
BRUSHLESS D.C. MOTOR
Seiji Fukuda, Tokyo, Japan, assignor to Akai Electric Company Limited, Tokyo, Japan, a Japanese corporation
Filed Jan. 2, 1968, Ser. No. 695,039
Claims priority, application Japan, Aug. 8, 1967, 42/50,840
Int. Cl. H02k 29/02; H02p 1/18
U.S. Cl. 318—138                        3 Claims

ABSTRACT OF THE DISCLOSURE

A brushless D.C. electric motor comprising a stator comprising a plurality of windings; a magnetized rotor mounted rotatably relative to said stator; and an electronic oscillator having a low operating frequency such as 14 cycles per second and a plurality of stages connected respectively with said windings, wherein at the starting period of said rotor the oscillator acts as such and at the normal running speed of said rotor it acts as switching means for distributing supplied current to said windings in a successive order.

---

This invention relates to a brushless or commutatorless D.C. motor, especially adapted for use in the drive mechanism of a magnetic tape recorder, video tape recorder, record player or the like machine wherein the drive prime mover is necessary to rotate at constant speed or at a high operational speed.

Conventional electric motors used in various audio machines, especially tape recorders, are generally of D.C. motors having brushes or commutators which represent however considerable drawbacks such as generation of sparks and noises. Another difficulty resides in a frequently encountered difficulty in the starting of the motor, caused by wears, considerable frictional resistance and occasional corrosion at the place of said brushes or commutators.

Brushless D.C. motors have been devised and are nowadays in their broad use, thereby obviating substantially said brushing troubles. But, in this case, a considerable difficulty of self-starting has been met. In order to avoid said starting difficulties, brushes and the like mechanical means have been employed which resulted naturally in the first mentioned brushing problems. As an alternative means, control means for controlling transistors provided for switching purposes for supplied currents to the stator windings, said means comprising electronic control means such as sensing coils, permanent magnet generator, phototransistors, Hall generator and/or the like.

These additional appliances do not naturally directly partain the rotational movement of the motor, thus inviting additional troubles and costs for maintaining the same and in addition increasing the occupying space of the motor assembly. Troublesome and costly are naturally the production and assembly of that kind of motor.

The main object of the invention is to provide a brushless D.C. motor, capable of self-starting with easiness.

A further object of the invention is to provide an electric motor of the above kind, capable of dispensing with conventional complicated control appliances which are inevitable to fit to the conventional brushess D.C. motor, yet highly adapted for smooth running at constant and/or high speed.

Still another object is to provide a D.C. motor of the above kind, having current control elements consisting of highly cheap and simple circuit elements such as transistors, condensers, resistors and the like.

The invention resides in its broadest aspect in a brushless D.C. electric motor having a stator and a rotor comprising a plurality of stator windings constituting said stator and mounted with gaps around said rotor, the latter being magnetized permanently and laterally of an axial plane passing through the longitudinal axis of said rotor, said winding being wound in a Y-connection with each other; a transistored oscillator and switching assembly having a plurality of transistor means electrically connected respectively with said windings and adapted for becoming conductive successively; a plurality of delay means, each being provided between two successive transistor means; and connecting means for connecting said transistor means in a ring connection, the oscillating frequency of said oscillator assembly being selected within a range allowing said rotor to perform self-starting, the induced voltage in one of said windings by the starting rotation of said rotor causing the next successive transistor means to fire.

In U.S. Patent 2,810,843, granted Oct. 21, 1957 to Carl-Erik, there is disclosed an A.C. motor which is fitted with an electronic converter in the form of oscillator adapted for control of the feeding current to the motor. In this motor, the rotational speed thereof depends upon the working frequency of the converter, even when neglecting that the motor is of A.C. type. The operation mode of the present inventive D.C. motor is different from said motor according to said prior U.S. patent in that the operational speed is not substantially decided by the electronic oscillator, although in my invention there is similarly provided an electronic oscillator, which however acts as a switching means for control of the feeding current to the stator windings when the rotor has started in effect.

These and further objects, features and advantages of the invention will become more clear when reading the following detailed description of the invention by reference to the accompany drawings which illustrate only by way of example a preferred embodiment of the invention.

In the drawing, FIG. 1 is a wiring diagram of an oscillator circuit constituting part of the brushless or commutatorless electric D.C. motor according to the present invention.

FIG. 2 is voltage wave curves as appearing at several preferred points of the circuit shown in FIG. 1.

Figure 1:
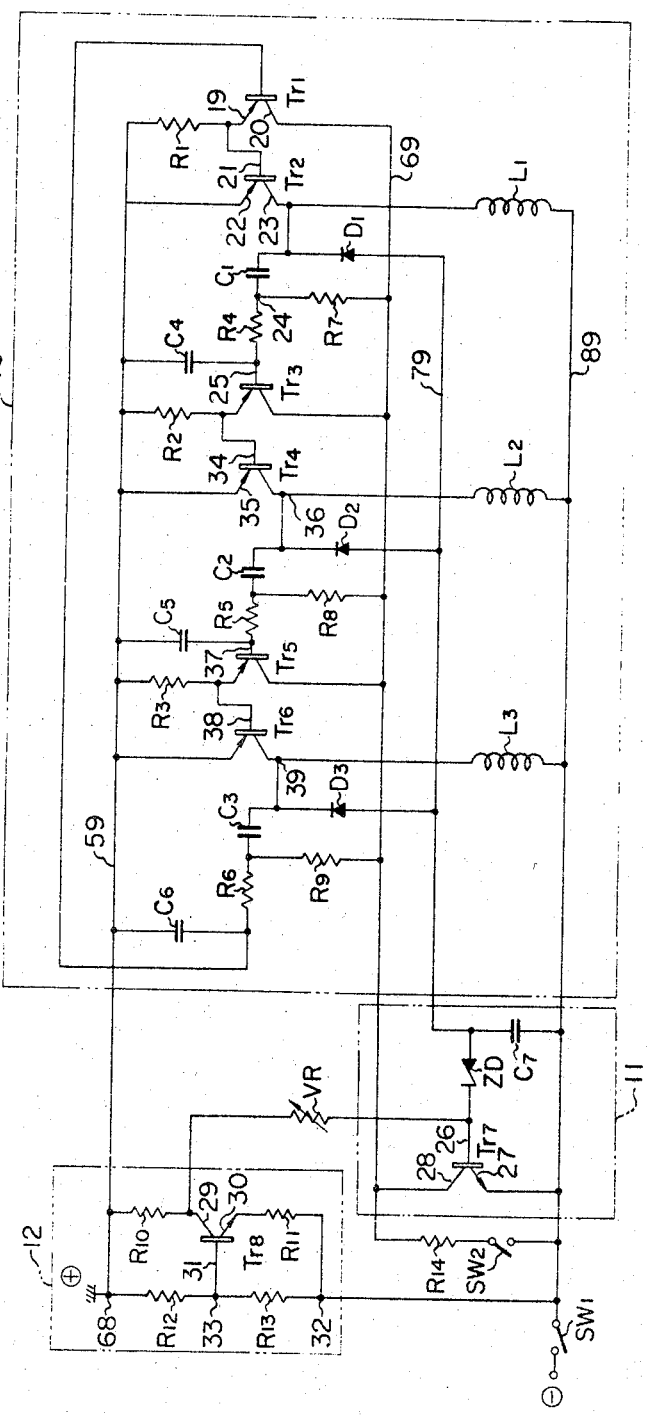

Now referring to the drawings, especially FIG. 1 thereof, the numeral 10 denotes generally an electronic oscillator, 11 a current control circuit electrically connected with the oscillator and 12 a constant voltage circuit electrically connected with said control circuit.

The oscillator 10 comprises p-n-p junction transistors $Tr_1$, $Tr_2$, $Tr_3$, $Tr_4$, $Tr_5$ and $Tr_6$ and stator windings $L_1$, $L_2$, and $L_3$, thereby constituting generally a three-phase oscillator. As seen, the oscillator comprises a ring connection of the first phase circuit comprising transistors $Tr_1$ and $Tr_2$, the second phase circuit comprising transistors $Tr_3$ and $Tr_4$ and the third phase circuit comprising transistors $Tr_5$ and $Tr_6$, respectively.

Emitter electrode 19 of transistor $Tr_1$ belonging to the first phase circuit is electrically connected through a resistor $R_1$ to earth conductor 59, while collector electrode 20 is connected permanently to a conductor 69.

Base electrode 21 of transistor $Tr_2$ is electrically connected with said emitter electrode 19, while emitter electrode 13 of the second transistor $Tr_2$ is permanently connected to earth conductor 59. Collector electrode 23 of the second transistor $Tr_2$ is electrically connected through first phase stator winding $L_1$ which is inserted in a conductor 89 which leads through a switch $SW_1$ to the negative pole of a D.C. source, preferably 24 volts, not specifically shown.

The connecting mode of transistors $Tr_3$ and $Tr_4$ belonging to the second phase circuit and that of transistors $Tr_5$ and $Tr_6$ are similar to that described hereinabove with reference to transistors $Tr_1$ and $Tr_2$. In this case, however, respective resistors $R_2$ and $R_3$ correspond to said resistor $R_1$ and respective stator windings $L_2$ and $L_3$ correspond to said winding $L_1$.

The mutual connection between said first and second phase circuits is mainly such that collector electrode 23 of transistor $Tr_2$ is connected through coupling condenser $C_1$, junction 24 and resistor $R_4$ to the base electrode at 25, the latter being connected through condenser $C_4$ to said earth conductor 59. Said junction 24 is connected through a resistor $R_7$ to lead 69, this resistor being provided for biasing purpose of transistor $Tr_3$. Resistor $R_4$ and condenser $C_4$ constitute in combination a kind of integral circuit serving for signal retarding, as will be more fully described hereinafter.

The mutual connection between the second and the third phase circuit, and that between the third and first phase circuits are made in the similar way as above described in connection with the first and second phase circuits, as may be easily supposed at a glance of FIG. 1. In this case, respective condensers $C_2$ and $C_3$ correspond to condenser $C_1$, and respective combinations of $R_5$ and $C_5$ and $R_6$ and $C_6$ correspond to the combination of $R_4$ and $C_4$. In the similar way, respective biasing resistors $R_8$ and $R_9$ correspond to said resistor $R_7$.

Now turning to the current control circuit 11 comprising a n-p-n junction type transistor $Tr_7$, the base electrode at 26 of the transistor is connected with Zener diode ZD which is further connected through common lead 76 and diodes $D_1$, $D_2$ and $D_3$ to the respective collector electrodes of said transistors $Tr_2$, $Tr_4$ and $Tr_6$, respectively. Zener diode ZD is inserted in the circuit in such a way that it represents the reverse polarity when seen from the side of the base 26 of transistor $Tr_7$. Diodes $D_1$, $D_2$ and $D_3$ are of the reverse polarity when seen from the side of the respective collectors of transistors $Tr_2$, $Tr_4$ and $Tr_6$. Emitter electrode 27 of transistor $Tr_7$ is connected directly to the common negative conductor 89 and collector electrode 28 of the same transistor is led to said conductor 69. Between Zener diode ZD and the conductor 89 there is inserted a condenser $C_7$ which serves for smoothening purpose.

The constant voltage circuit 12 comprises a n-p-n junction type transistor $Tr_8$ the collector electrode 29 of which is connected through a variable resistor VR to the base electrode 26 of said transistor $Tr_7$ on the one hand and through resistor $R_{10}$ to earth conductor 59, on the other. The variable resistor VR serves for adjustment of bias current of transistor $Tr_7$ adapted for the current control service. Emitter electrode 30 of transistor $Tr_8$ is connected through a feed-back resistor $R_{11}$ to junction point 32 leading to the negative conductor 89. Bleeder resistors $R_{12}$ and $R_{13}$ are inserted between junctions 32 and 33, and between junctions 33 and 68, respectively, the last junction 68 being provided in the earth conductor 59, while the intermediate junction 33 is connected directly to the base electrode 31 of transistor $Tr_8$.

Resistor $R_{14}$ is connected at its one end through switch $SW_2$ to the negative conductor 89 and at its another end to conductor 69. This resistor $R_{14}$ serves as a bypass resistor for bypassing the current control circuit 11 when the switch $SW_2$ is closed for high speed running of the motor, as will be more fully described hereinafter.

The electric motor according to the present invention comprises, in addition to stator windings $L_1$, $L_2$ and $L_3$ which constitute in combination a stator 48 which is adapted for cooperation with a rotor 40, the latter being a permanent bar magnet magnetized laterally of an axial plane passing through the central axis of the rotor rotatably mounted in a pair of conventional bearings 100 and 101 supported on motor housing 102.

The operation of the motor so far described is as follows:

When the switch $SW_1$ is manually or automatically closed, as the case may be, depending upon the design of the machine in which said motor is fitted, current is supplied from the D.C. current source to the oscillator 10 so that the latter will initiate to oscillate at 14 cycles/second by way of example.

The oscillating mode is as follows:

When collector current flows to transistor $Tr_2$ of the first phase circuit, as an example, a voltage drop at the collector 23 will appear on account of the provision of the stator winding $L_1$. This voltage curve is shown schematically at (a), FIG. 2. This kind of voltage alteration caused by the aforementioned kind voltage drop will be called "signal" hereinafter throughout the specification. This signal is conveyed through the coupling condenser $C_1$ and the related integral circuit comprising condenser $C_4$ and resistor $R_4$ to the base 25 of transistor $Tr_3$. The signal voltage curve at this base 25 is shown only schematically and by way of example at (b), FIG. 2. As will be clearly acknowledged, this signal (b) is phase-retarded a certain amount in comparison with the voltage at (a) under the influence of the action of the integrating circuit.

By the application of the signal to the base 25, the emitter-collector passage of the transistor $Tr_3$ will become conductive during a specific conductive period, thereby a signal, the wave form of which is shown only schematically at (c), FIG. 2, will appear at the emitter resistor $R_2$.

This signal is transmitted to the base 34 of transistor $Tr_4$ of the next stage, thus the transistor being driven. The emitter-collector passage of the transistor $Tr_4$ will become thus conductive for a predetermined conducting period, during which current will flow through the second phase stator winding $L_2$. The voltage wave form at this stage appearing at the collector is shown only schematically at (d), FIG. 2.

The signal appearing at the collector 36 is conveyed in the similar manner as before through coupling condenser $C_2$ and integrating circuit comprising $R_5$ and $C_5$, thence to the third phase circuit wherein its contained transistors $Tr_5$ and $Tr_6$ will act in the similar way as the transistors $Tr_5$ and $Tr_6$ of the second phase circuit already described hereinbefore. The signal form as appearing at the base 37 of transistor $Tr_5$ is shown at (e), FIG. 2. In the similar way, the signal form as appearing at the base 38 of transistor $Tr_6$ is shown at (f), FIG. 2. The signal form at the collector 39 is illustrated at (g). From these schematic representations, the working modes of several transistors so far described will be understood easily by those skilled in the art without further analysis. As seen by comparing signal forms at (a), (d) and (g), the conducting order of transistors $Tr_2$, $Tr_4$ and $Tr_6$, which may be optional according to the whole working conditions of the oscillator circuit, determines the current conducting order of the stator windings $L_3$, $L_2$ and $L_1$, as specific in this case.

Next, the operation of the constant voltage circuit 12 will be described in detail hereinbelow:

The transistor $Tr_8$ is biased in the normal direction by the provision of bleeder resistors $R_{12}$ and $R_{13}$ and a collector current is flowing through resistor $R_{10}$.

If there be a fluctuation in the source voltage, the fluctuation being assumed to be in voltage-increasing direction, the bias of transistor $Tr_8$ will shift in the direction towards increase of the collector current.

On the contrary, if the fluctuation be in the lowered source voltage, the collector current will be correspondingly reduced. It will be seen thus that the voltage drop across the resistor $R_{10}$ will be larger or lesser depending upon occasional fluctuation in the source voltage.

The voltage drop across resistor $R_{10}$ is transmitted through variable resistor VR between the base 26 of transistor $Tr_7$ of current control circuit 11 and the negative electrode of Zener diode ZD. The bias voltage of the transistor $Tr_7$, or the voltage appearing between emitter 27 and base 26, is kept substantially at a constant level regardless of possible fluctuations of the source voltage. By the said bias voltage, the transistor will become conductive and collector currents at the respective collectors of transistors $Tr_1$, $Tr_3$ and $Tr_5$ will be conveyed through the collector-emitter passage of said transistor $Tr_7$ to the negative conductor 89.

On the other hand, respective signals at the collectors of transistors $Tr_2$, $Tr_4$ and $Tr_6$ are subjected to rectification by diodes $D_1$, $D_2$ and $D_3$, smoothed through condenser $C_7$ and conveyed as a direct current voltage to the positive electrode of Zener diode ZD.

Normally, the voltage at the negative pole of the diode ZD is higher than that appearing at the negative pole of the same diode, thus the voltage being impressed upon the diode in the reverse direction. If the signals appearing at the respective collectors of said transistors $Tr_2$, $Tr_4$ and $Tr_6$, the D.C. voltage as obtained by the rectification at $D_1$, $D_2$ and $D_3$ will become further increased in the negative sense and the reverse current flowing from the negative to the positive side of the diode ZD will increase. This reverse current flows through resistor $R_{10}$ and variable resistor VR and the voltage drop across these resistors will become further large, and the bias voltage of transistor $Tr_7$ will shift in the reducing direction of the collector current.

It will be clear from the foregoing that the collector currents at transistors $Tr_1$, $Tr_3$ and $Tr_5$ are controlled by the respective signals appearing at the respective collectors of transistors $Tr_2$, $Tr_4$ and $Tr_6$. In effect, the collector currents at $Tr_2$ $Tr_4$ and $Tr_6$, and thus currents periodically flowing through stator windings $L_1$, $L_2$ and $L_3$ are controlled in the same way as above described.

Figure 3:
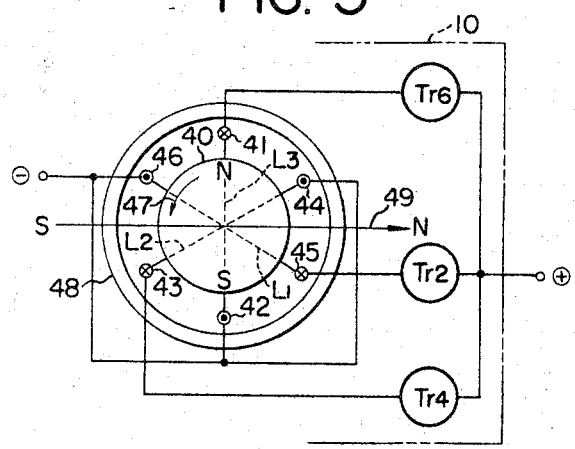
FIG. 3 is a schematic explanatory representation of the electric motor according to this invention, illustrative of the operation of the motor.

Further referring to FIG. 3, the oscillator 10 is schematically represented as comprising only transistors $Tr_6$, $Tr_2$ and $Tr_4$ for simplicity. There is also shown the rotor 40 in a simplified form.

Conductors 41, 42 represents representatively the winding $L_3$; conductors 43, 44 the winding $L_2$; and conductors 45, 46 the winding $L_1$.

Now considering that the electronic oscillator 10 is caused to oscillate at its predetermined frequency, current will flow successively through stator windings $L_3$, $L_2$ and $L_1$. The current flow directions may well be understood from the exemplified representations of the respective conductors 41, 42, 43, 44 and 45, 46, respectively, without further analysis. Therefore, the rotor 40 will be rotated in the counter-clockwise direction in FIG. 3.

More specifically, when the transistor $Tr_6$ becomes conductive and the magnetic poles N and S are positioned as shown in FIG. 3, the rotor will initiate to rotate in the counter-clockwise direction. When the representative or predominant zone of the north pole N of said rotor which was positioned previously in opposition to said conductors 41, 42 or stator winding $L_3$ approaches to the close proximity to the conductors 43, 44 or stator winding $L_2$, transistor $Tr_4$ will become conductive and current will flow through the winding $L_2$. For this purpose, the operating frequency of the electronic oscillator 10 is selected to a considerably lower one, such as 14 cycles per second, as was referred to hereinbefore, and the rotor mass is selected so as to meet with the synchronous requirement. By the passage of current through the winding $L_2$, the rotor receives again a torque in the counterclockwise direction, thus capable of performing a continued rotation. Similar operation will occur repeatedly thereafter, and, for the time being, the rotor 40 will maintain its rotation in synchronism with successive operation of related transistors $Tr_2$, $Tr_4$ and $Tr_6$.

When the rotation of the rotor 40 should not occasionally be in asynchronous with the periodical oscillation of the oscillator circuit 10, or more specifically, as an example, when the rotor, having received a turning torque in the counter-clockwise direction induced by passage of current through stator winding $L_3$, approaches at close proximity to the next succeeding conductor 46 of the first phase stator winding $L_1$ at a slower speed than the predescribed synchronous one, on account of, for instance, a heavier mass selected for the rotor 40, the latter may be subjected to a reversing torque caused by current passage through conductors 45, 46 upon the preceding and regular current passage through conductors 43, 44 of the stator winding $L_2$. If such asynchronous running of the rotor 40 should occur, a "hunting" phenomenon would be invited. This difficulty can be remedied by selecting the operating frequency of the oscillator 10 to a slower value than the aforementioned specific value or more specifically 14 cycles per second. For this purpose, a larger time constant is alloted to each of the integrating circuits contained in the oscillator.

Figure 4:
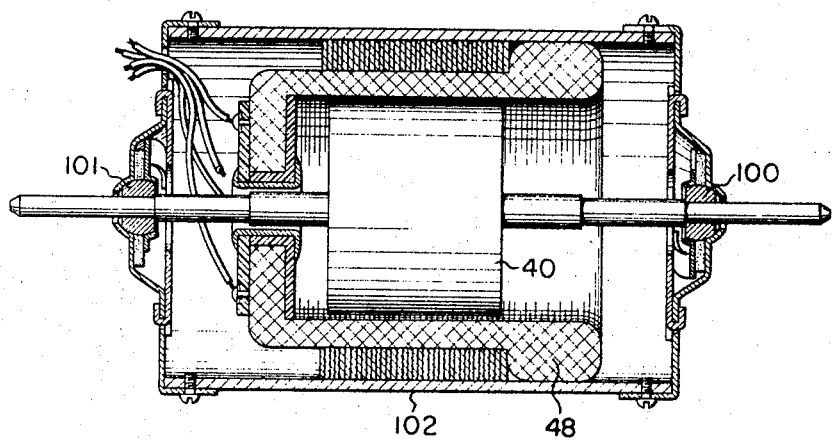
FIG. 4 is a longitudinal sectional view of the motor with the electronic oscillator part shown in FIG. 1 being however omitted from the drawing.

It will be noted, therefore, that with use of a properly selected operating frequency of the oscillator, the rotor can continue to perform a certain synchronous revolution by the passage of current in succession through stator windings $L_1$, $L_2$ and $L_3$, the assembly thereof being shown at 48 in FIG. 4.

The operating frequency of the oscillator 10 should be, at the starting period of the rotation of said rotor 40, within such frequency range which allows the synchronous ortation in the aforementioned sense. This frequency depends upon various conditions such as the magnetization degree and mass of said rotor 40, the number of turns of each of said stator coils $L_1$ $L_2$ and $L_3$, the amount of supply current and the like, thus being unable to determine it in a simple and definite way. As a practical measure, trial and error procedure by several comparative experiments will generally do.

When the rotor 40 initiates to rotate in the aforementioned way, a voltage will be induced in each of said stator windings $L_1$, $L_2$ and $L_3$, the thus induced voltage depending, as commonly known by those skilled in the art, upon the number of turns of each stator winding, the degree of energization of said rotor and the rotational speed of the latter.

The induced voltage in the first phase stator coil $L_1$, as an example, is conveyed through coupling condenser $C_1$ to the integrating circuit consisting of resistor $R_4$ and condenser $C_4$, thereby making transistor $T_4$ conductive and then transistor $Tr_4$ inserted the next successive stage, so as to pass current through the second phase stator winding $L_2$.

In the similar way, the induced voltages in the second and the third phase stator winding $L_2$ and $L_3$, respectively, are conveyed through respective coupling condensers $C_2$ and $C_3$ to respective integrating circuits comprising $R_5$ and $C_5$ and $R_6$ and $C_6$, respectively, thereby transistors $Tr_5$ and $Tr_1$ becoming conductive.

It will be easily understood that the aforementioned operation of the circuit 10 is a kind of switching the operating mode of which depends naturally upon the degree of the induced voltage. With higher roational speed of the rotor 40, a correspondingly higher voltage will be induced in each of the stator windings and the bias voltage at each of transistors $Tr_1$, $Tr_2$ and $Tr_3$ will sooner become the conductive one. Thus, the switching operation of the circuit 10 will take place rather rapidly, thereby the rotor speed being correspondingly accelerated.

Diodes $D_1$, $D_2$ and $D_3$ serve to rectify the respectively induced voltages in stator windings $L_1$, $L_2$ and $L_3$, thereby a D.C. voltage in proportion to the rotational speed of the rotor being each time being detected and conveyed to the positive pole of Zener diode ZD.

When the rotational speed of rotor 40 becomes higher than a predetermined value such as 3,000 r.p.m., for instance, the voltage applied to the Zener diode ZD will correspondingly higher and, as was already referred to hereinbefore, the reverse current through the Zene diode will become futher increased, the bias to transistor $Tr_7$ acting as current control means serving for reducing the collector current and thereby said transistors $Tr_1$, $Tr_3$ and $Tr_5$ and then $Tr_2$, $Tr_4$ and $Tr_6$ becoming substantially interrupted. In this way, currents to flow through respective stator windings $L_1$, $L_2$ and $L_3$ are correspondingly reduced and the rotational speed of the rotor 40 will be retarded. By the above means, the rotor speed can be maintained substantially at a constant value.

If it is desired to adjust the rotational speed of the above motor, the resistance value of the variable resistor VR is varied correspondingly. By this means, the speed can be varied as desired in a simple manner.

By manual closure of said switch $SW_2$, the respective collectors of transistors $Tr_1$, $Tr_3$ and $Tr_5$ are connected through resistor $R_{14}$ to the negative conductor 89. In this case, the motor will be driven at a higher speed such as 3,900 r.p.m. with the current control circuit 11 being by-passed.

While the invention has been particularly shown and described with reference to a preferred embodiment thereof, it will be understood by those skilled in the art that various changes in form and details may be made therein without departing from the spirit and scope of the invention.

What I claim is:

1. A brushless D.C. electric motor having a stator and a rotor comprising a plurality of stator windings constituting said stator and mounted with gaps around said rotor, the latter being magnetized permanently and laterally of an axial plane passing through the longitudinal axis of said rotor, said windings being wound in a Y-connection with each other; a transistored oscillator and switching assembly having a plurality of transistor means electrically connected respectively with said windings and adapted for becoming conductive successively; a plurality of delay means, each being provided between two successive transistor means; and connecting means for connecting said transistor means in a ring connection, the oscillating frequency of said oscillator assembly being selected within a range allowing said rotor to perform self-starting, the induced voltage in one of said windings by the starting rotation of said rotor causing the next successive transistor means to fire.

2. A motor as set forth in claim 1, characterized by that the number of said stator windings is three and said oscillator is a three phase oscillator.

3. A motor as set forth in claim 1, further comprising rectifier means adapted for rectifying the voltages induced in the stator windings and current control means electrically connected with said rectifier means adapted for controlling the rotational speed of said rotor.

References Cited

UNITED STATES PATENTS

| | | | |
|---|---|---|---|
| 2,814,769 | 11/1957 | Williams | 318—138 |
| 3,242,406 | 3/1966 | Tanaka | 318—138 |
| 3,304,481 | 2/1967 | Saussele | 318—138 |
| 3,339,133 | 8/1967 | Faure | 318—138 |

G. R. SIMMONS, Primary Examiner

U.S. Cl. X.R.

318—254